(12) United States Patent
Gilbane et al.

(10) Patent No.: US 8,473,337 B2
(45) Date of Patent: Jun. 25, 2013

(54) AUCTIONING SEGMENTED AVAILS

(75) Inventors: Stephen D. Gilbane, Cambridge, MA (US); Jason C. Davenport, Sharon, MA (US); James P. Schwartz, Newton, MA (US); Lisa L. Lutz, Sudbury, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 12/790,157

(22) Filed: May 28, 2010

(65) Prior Publication Data

US 2011/0295700 A1 Dec. 1, 2011

(51) Int. Cl.
*G06Q 30/00* (2012.01)
(52) U.S. Cl.
USPC ........................................................ 705/14.1
(58) Field of Classification Search
USPC ........................................................ 705/14.1
See application file for complete search history.

(56) References Cited

U.S. PATENT DOCUMENTS

| | | | |
|---|---|---|---|
| 2003/0163410 A1 | 8/2003 | Byde et al. | |
| 2006/0224496 A1 | 10/2006 | Sandholm et al. | |
| 2007/0156575 A1 | 7/2007 | Sandholm et al. | |
| 2007/0288953 A1* | 12/2007 | Sheeman et al. | 725/34 |
| 2008/0065508 A1* | 3/2008 | Watt et al. | 705/26 |
| 2008/0097838 A1 | 4/2008 | Lin et al. | |
| 2008/0275775 A1 | 11/2008 | Gonen et al. | |
| 2008/0313089 A1 | 12/2008 | Du Preez | |
| 2009/0259550 A1 | 10/2009 | Mihelich et al. | |
| 2010/0088152 A1 | 4/2010 | Bennett | |

FOREIGN PATENT DOCUMENTS

KR 1020050097154 A 10/2005

OTHER PUBLICATIONS

Hunsberger, Luke et al., "A Combinatorial Auction for Collaborative Planning", *In Proceedings of ICMAS 2000*, Available at <http://citeseerx.ist.psu.edu/viewdoc/download?doi=10.1.1.35.1621&rep=rep1&type=pdf>,(2000),9 pages.
Kelly, Frank et al., "A Combinatorial Auction with Multiple Winners for Universal Service", *University of Cambridge*, Available at <http://citeseerx.ist.psu.edu/viewdoc/download?doi=10.1.1.35.5796&rep=rep1&type=pdf>,(1998),pp. 1-17.
"International Search Report", Mailed Date: Jan. 13, 2012, Application No. PCT/US2011/037824, Filed Date: May 25, 2011, pp. 9.

\* cited by examiner

*Primary Examiner* — Daniel Lastra
(74) *Attorney, Agent, or Firm* — Wolfe-SBMC (57) ABSTRACT

Various embodiments enable auctioning of segmented advertisement insertion opportunities, e.g., segmented avails, associated with distributed content. In at least some embodiments, bids from advertisers to place advertisements in conjunction with a segmented avail are obtained. The bids that are obtained can have different durations (e.g., 60, 30, 15 seconds) that can be selectively enabled by a segmented avail in various combinations to fill a total duration of the segmented avail. Ranking criteria and/or logic can be applied to rank the bids one to another. In at least some embodiments, the bids are ranked within groups corresponding to different time durations. Bids can be allocated to the segmented avail by testing one or more combinations of the bids and selecting a winning combination based at least in part upon a sum of the ranks associated with bids in the combination.

20 Claims, 6 Drawing Sheets

AUCTIONING SEGMENTED AVAILS

BACKGROUND

Content distributed by a network operator to clients, including satellite radio, streaming media over the Internet, digital cable television programming, and so on can be configured to contain advertisement insertion opportunities that are referred to as "avails." Traditionally, avails have a corresponding duration that is fixed. Accordingly, avails of this type can be filled using a single advertisement that has a duration that is substantially the same as the duration of the avail. Ads from advertisers, though, can have durations of varying length. Traditional avails that are limited to being filled using ads of a fixed duration can reduce flexibility to place ads and make it difficult to optimize allocation of multiple ads to a large inventory of avails.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable auctioning of segmented advertisement insertion opportunities, e.g., segmented avails, that are associated with television content or other media entertainment. In at least some embodiments, bids from advertisers to place advertisements in conjunction with a segmented avail are obtained. The bids that are obtained can have different durations (e.g., 60, 30, 15 seconds) that can be enabled by a segmented avail in various combinations to fill a total duration of the segmented avail. Ranking criteria and/or logic can be applied to rank the bids one to another. In at least some embodiments, the bids can be ranked within groups corresponding to different durations. Bids can be allocated to the segmented avail by testing one or more combinations of bids and selecting a winning combination based at least in part upon a sum of the ranks associated with bids in the combination.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable auctioning of segmented advertisement insertion opportunities, e.g., segmented avails, that are associated with television content or other media entertainment. In at least some embodiments, bids from advertisers to place advertisements in conjunction with a segmented avail are obtained. The bids that are obtained can have different durations (e.g., 60, 30, 15 seconds) that can be associated with or otherwise enabled by a segmented avail in various combinations to fill a total duration of the segmented avail. Ranking criteria and/or logic can be applied to rank the bids one to another. In at least some embodiments, the bids can be ranked within groups corresponding to different time durations. Bids can be allocated to the segmented avail by testing one or more combinations of bids and selecting a winning combination based at least in part upon a sum of the ranks associated with bids in the combination.

In the discussion that follows, a section entitled "Operating Environment" describes but one environment in which various embodiments of auctioning segmented avails can be employed. Following this, a section entitled "Example Procedures" describes example techniques for auctioning segmented avails. Next, a section entitled "Example Bid Allocation" describes an example allocation of bids to a segmented avail in accordance with the example techniques. Last, a section entitled "Example System" is provided and describes an example system that can be used to implement one or more embodiments.

Operating Environment

Figure 1:
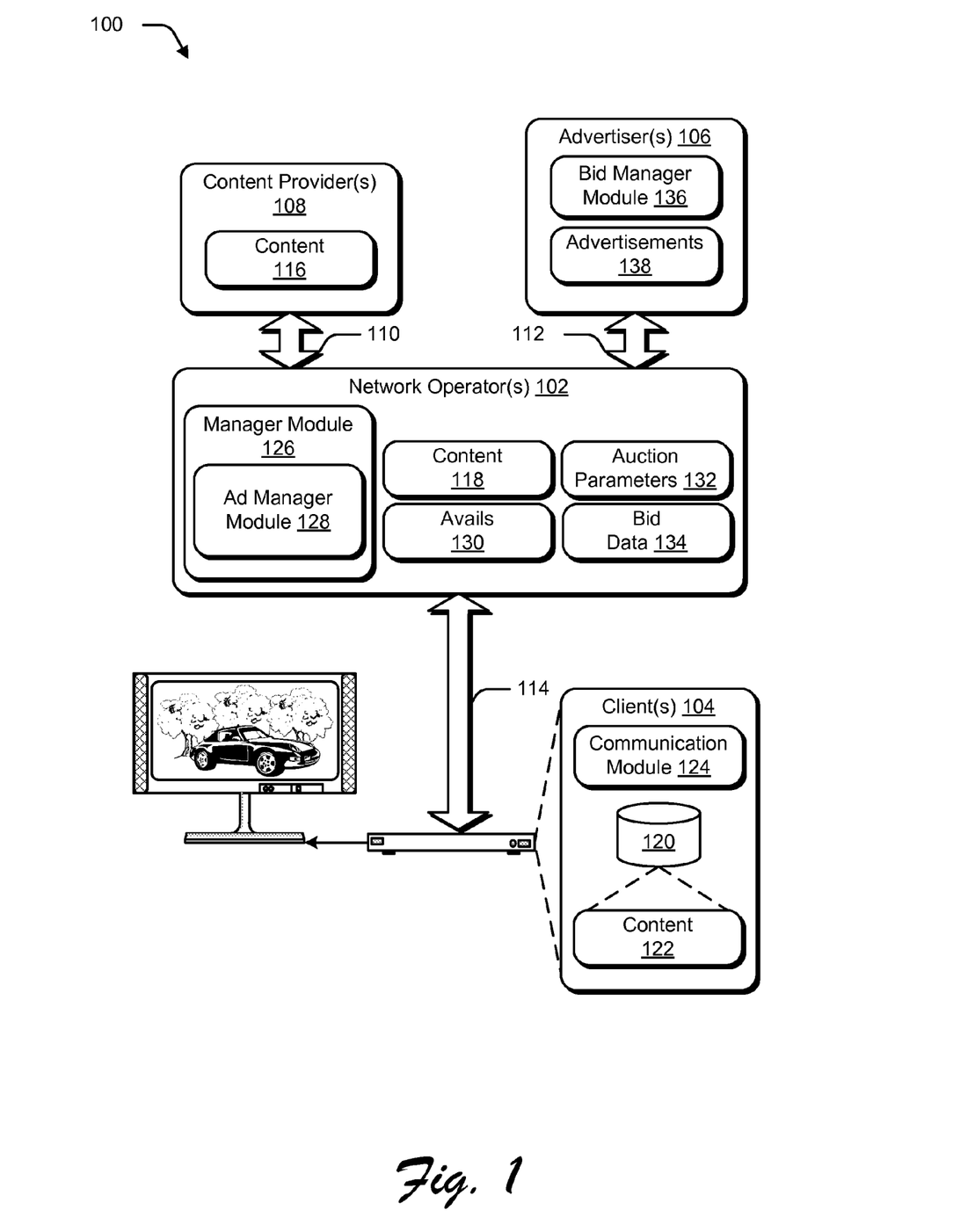
FIG. 1 is an illustration of an example operating environment in that is operable to employ techniques to auction segmented avails in one or more embodiments.

FIG. 1 is an illustration of an example operating environment 100 that is operable to employ techniques for auctioning segmented avails. The illustrated environment 100 includes a network operator 102 (e.g., a "head end" or "distribution server"), a client 104, an advertiser 106 and a content provider 108 that are communicatively coupled, one to another, via network connections 110, 112, 114. Although a plurality of network connections 110-114 are shown separately, the network connections 110-114 may be representative of network connections achieved using a single network or multiple networks.

The network operator 102, the client 104, the advertiser 106 and the content provider 108 can each be implemented by way of one or more computing devices having respective processors, memories, storage, and/or other hardware and software components typically associated with various computing devices. One particular example of a computing device is shown and described in relation to FIG. 6 herein. In the following discussion, the network operator 102, the client 104, the advertiser 106 and the content provider 108 may be representative of one or more entities, and therefore reference may be made to a single entity (e.g., the client 104) or multiple entities (e.g., the clients 104, the plurality of clients 104, and so on).

The client 104 can be configured in a variety of ways. For example, the client 104 may be configured as a computer that is capable of communicating over the network connection 114, such as a desktop computer, a mobile station, an entertainment appliance, a set-top box communicatively coupled to a display device as illustrated, a wireless phone, and so forth. Thus, the client 104 may range from a full resource device with substantial memory and processor resources (e.g., television-enabled personal computers, television recorders equipped with hard disk) to a low-resource device with limited memory and/or processing resources (e.g., traditional set-top boxes). For purposes of the following discussion, the client 104 may also relate to a person and/or entity that operate the client. In other words, client 104 may describe a logical client that includes a user, software and/or a machine.

The content provider 108 includes one or more items of content 116. The content 116 may include a variety of data, such as television programming, video-on-demand (VOD) files, one or more results of remote application processing, and so on. The content 116 is communicated over the network connection 110 to the network operator 102.

Content 116 communicated via the network connection 110 can be received by the network operator 102 and stored as one or more items of content 118. The content 118 may be the same as or different from the content 116 received from the content provider 108. The content 118, for instance, may include additional data for broadcast to the client 104. For example, the content 118 may include electronic program guide (EPG) data from an EPG database for broadcast over an out-of-band (OOB) channel to the client 104 using the network connection 114. Distribution from the network operator 102 to the client 104 may be accommodated in a number of ways, including cable, radio frequency (RF), microwave, digital subscriber line (DSL), and satellite.

The client 104 typically includes hardware and software to transport and decrypt content 118 received from the network operator 102 for rendering by the illustrated display device. Although a display device is shown, a variety of other output devices are also contemplated, such as speakers.

The client 104 can also include digital video recorder (DVR) functionality. For instance, the client 104 may include a storage device 120 to record content 118 as content 122 received via the network connection 114 for output to and rendering by the display device. The storage device 120 may be configured in a variety of ways, such as a hard disk drive, a removable computer-readable storage medium (e.g., a writable digital video disc), and so on. Thus, content 122 that is stored in the storage device 120 of the client 104 may be copies of the content 118 that was streamed from the network operator 102. Additionally, content 122 may be obtained from a variety of other sources, such as from a computer-readable storage medium that is accessed by the client 104, and so on.

The client 104 includes a communication module 124 that is executable on the client 104 to control content playback on the client 104, such as through the use of one or more "command modes." The command modes may provide non-linear playback of the content 122 (i.e., time shift the playback of the content 122) such as pause, rewind, fast forward, slow motion playback, and the like. For example, during a pause, the client 104 can continue to record the content 118 in the storage device 120 as content 122. The client 104, through execution of the communication module 124, can then playback the content 122 from the storage device 120, starting at the point in time the content 122 was paused, while continuing to record the currently-broadcast content 118 in the storage device 120 from the network operator 102.

When playback of the content 122 is requested, the communication module 124 is executed on the client 104 to retrieve the content 122. The communication module 124 can also restore the content 122 to the original encoded format as received from the content provider 108. For example, when the content 122 is recorded on the storage device 120, the content 122 may be compressed. Therefore, when the communication module 124 retrieves the content 122, the content 122 is decompressed for rendering by the display device.

The network operator 102 is illustrated as including a manager module 126. The manager module 126 is representative of functionality to configure content 118 for output (e.g., streaming) over the network connection 114 to the client 104. The manager module 126, for instance, can configure content 116 received from the content provider 108 to be suitable for transmission over the network connection 114, such as to "packetize" the content for distribution over the Internet, configuration for a particular broadcast channel, and so on.

Thus, in the environment 100 of FIG. 1, the content provider 108 can broadcast the content 116 over a network connection 110 to a multiplicity of network operators, an example of which is illustrated as network operator 102. The network operator 102 may then stream the content 118 over a network connection to a multitude of clients, an example of which is illustrated as client 104. The client 104 can then store the content 118 in the storage device 120 as content 122, such as when the client 104 is configured to include digital video recorder (DVR) functionality.

The content 118 may also be representative of video-on-demand (VOD) content that is streamed to the client 104 when requested, such as movies, sporting events, and so on. For example, the network operator 102 can execute the manager module 126 to provide a VOD system such that the content provider 108 supplies content 116 in the form of complete content files to the network operator 102. The network operator 102 can then store the content 116 as content 118. The client 104 can then request playback of desired content 118 by contacting the network operator 102 (e.g., a VOD server) and requesting a feed of the desired content.

In another example, the content 118 may further be representative of content that was recorded by the network operator 102 in response to a request from the client 104, in what may be referred to as a network DVR example. Like VOD, the recorded content 118 can then be streamed to the client 104 when requested. Interaction with the content 118 by the client 104 may be similar to interaction that can be performed when the content 122 is stored locally in the storage device 120.

The client 104, for instance, can execute the communication module 124 to initiate control functions for interacting with the content 122. For example, the control functions may include control functions to time-shift output of the content 122 as well as channel selection, electronic program guide (EPG) navigation, purchase of on-demand content, and so on. In another implementation, the communication module 124 provides media player functionality to play media having audio and/or visual data, such as a satellite radio having storage to record songs and/or music videos locally on the client 104.

The communication module 124 may be utilized to time-shift an output of content (e.g., audio-visual content) from a variety of different sources, such as the locally stored content 122 and/or the remotely stored content 118. Regardless of the source, the content can provide a variety of opportunities in which to output advertisements.

Accordingly, techniques are described herein that can be employed to auction advertisements insertion opportunities to advertisers 106. For example, the network operator 102 may include or otherwise make use of an ad manager module 128 that is representative of functionality to implement an ad management system. The ad management system can provide ad auctions, such as to auction opportunities to output advertisements in conjunction with content. Although the ad manager module 128 is depicted as a part of the network operator 102, ad management may be provided in a variety of ways, such as through use of a third-party ad management service apart from the network operator 102, as a separate ad management system, as a part of a content provider 108, and so on.

Various content that is described herein can include or otherwise be associated with various advertisement insertion opportunities or "avails" at which advertisements can be inserted into the content or otherwise be shown when the content is output via a client 104. The network operator 102 is illustrated as having avails 130 that are representative of various advertisement insertion opportunities that can be associated with content in any suitable way.

For example, avails 130 can occur at the start of a television or other media program, during a break in an output of a program, between programs, after output of a program, and so forth. Further, avails 130 can occur in conjunction with content 122 that is local to the client 104, content 118 that is broadcast, and/or content 118 that is time-shifted, such as in the network DVR example discussed above.

To conduct auctions for the avails 130, ad manager module 128 can be configured to make use of auction parameters 132 and bid data 134. The auction parameters 132 are representative of a variety of data that can be employed to control the manner in which auctions are conducted. By way of example, auction parameters 132 can include auction rules, ranking criteria, and business logic/algorithms used to rank bids from advertisers one to another, operator pricing and constraint data, characteristics of avails, and so forth.

The bid data 134 is representative of data configured to describe various bids (e.g., media buys or orders) from advertisers 106 using various criteria. By way of example, bid data 134 can include budget and impression criteria, audience targeting criteria, scheduling criteria, content selection criteria, and/or other types of criteria used to specify bids. Further details regarding auction parameters 132 and bid data 134 can be found in relation to the following figures.

Bids to be submitted to an auction by an advertiser 106 can be formed in a variety of ways. Generally, advertisers 106 can interact with an ad management system to place orders or "media buys" using the various criteria discussed above to designate placement objectives (e.g., quantity, price, target audience, constraints, and so forth) for corresponding ads. A number of media buys associated with one or more ads can be combined to create an ad campaign. In this context, a bid can be considered as an application of a particular media buy to a particular avail based on the placement objectives and characteristics of the avail.

The advertiser 106, for instance, can employ a bid manager module 136 that is representative of functionality of the advertiser 106 to provide media buys and/or bids corresponding to advertisements 138 through interaction with the ad manager module 128. Placement objectives for a media buy can be quite specific. For instance, an example media buy can be placed to order 10,000 impressions of a particular ad (e.g., views of the ad by viewers) at a maximum cost of $5 per impression, during sports programs airing on weekends or after 5:00 PM on weekdays. In this manner, bid data 134 can be input to specify individual bids, media buys, ad campaigns, and the like. The ad manager module 128 can cause the input data from the advertisers 106 to be stored as bid data 134 and can then process the stored data to derive bids that are suitable for an auction involving a particular avail.

At least some of the avails 130 associated with content can be configured as ad insertion opportunities that enable the total duration of the avail to be divided into segments of varying length. Avails of this kind are referred to herein as "segmented avails." Accordingly, the ad manager module 128 can be configured to implement techniques to auction segmented avails to enable advertisers 106 to compete to place ads in conjunction with corresponding content. In general, an avail 130 has a designated spot length, such as ninety seconds, sixty seconds, and so forth. Traditionally, an avail 130 having a particular spot length that is "un-segmented" is filled with an ad having a duration that is about the same as the spot length. In other words a sixty second spot can be filled with an ad that has a duration of about sixty seconds. Segmented avails, though, can be configured to enable various valid combinations of ads having different durations that taken together fill the spot length. In other words, a segmented avail can be sub-divided into multiple shorter duration segments. For example, a sixty second segmented avail can be configured to enable combinations of one sixty second ad, two thirty second ads, a forty-five second ad and a fifteen second ad, and so forth.

Figure 2:
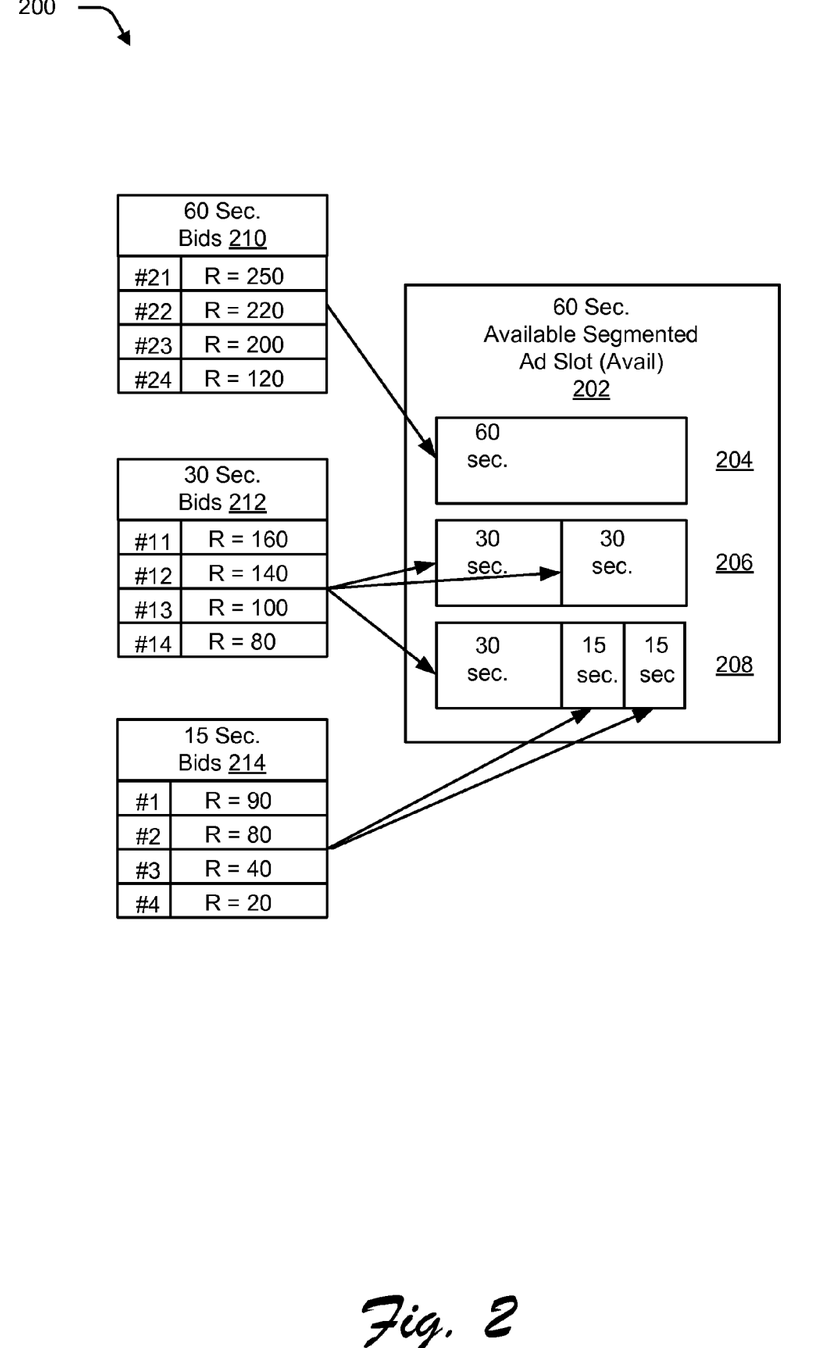
FIG. 2 is an illustration of an example segmented avail in accordance with one or more embodiments.

Consider now FIG. 2, which depicts generally at 200 an example of a segmented avail 202. The example segmented avail 202 has a spot length of sixty seconds and is associated with select number of "valid" duration combinations that are enabled for the segmented avail 202. Combinations of ads that can potentially fill a segmented avail are referred to herein as duration combinations. Numerous potential duration combinations can exist for a particular segmented avail. Any number of the potential duration combinations that exist for the particular segmented avail can be selectively enabled for the particular segmented avail. Generally, a duration combination is considered "valid," and can therefore be used for the particular segmented avail, when the duration combination (1) fills the spot and (2) is enabled for the particular segmented avail.

Examples of valid duration combinations in FIG. 2 include a first combination 204 configured to use one sixty second ad and a second combination 206 configured to use two thirty second ads to fill the segmented avail 202. The example duration combinations also include a third combination 208 configured to use one thirty second ad and two fifteen second ads to fill the segmented avail 202. FIG. 2 further depicts multiple candidate bids for the segmented avail 202 including a group 210 of sixty second bids, a group 212 of thirty second bids, and a group 214 of fifteen second bids. Notice that the candidate bids are assigned ranking values "R" to indicate that the bids have been ranked one to another.

In operation, ad manager module 128 can obtain the candidate bids and/or combinations that are valid for a segmented avail, rank the bids one to another using various ranking criteria and/or logic, and allocate the bids to the segmented avail using various techniques described above and below. For instance, the ad manager module 128 can be employed to designate a select number of the possible duration combinations that are valid for segmented avails in any suitable way. In at least some embodiments, each segmented avail can be individually associated with one or more duration combinations that are valid for the individual segmented avail. Thus, different duration combinations can be designated for avails of differing lengths and/or for different avails that have the same spot lengths. Additionally or alternatively, ad manager module 128 can be employed to specify valid duration combinations based on spot length. In this case, spots of the same length can be commonly associated with one or more corresponding valid duration combinations.

The different duration combinations for the example segmented avail 202 can be satisfied by selecting candidate bids having appropriate lengths. The selection of candidate bids to determine and allocate winning bids can occur using the rankings that are assigned to the bids. Further details regarding techniques to rank bids, allocate bids, and other aspects of auctioning segmented avails can be found in relation to the following figures.

Having considered an example operating environment, consider now a discussion of example procedures that can be employed in one or more embodiments of auctioning segmented avails.

EXAMPLE PROCEDURES

The following discussion describes example techniques for auctioning segmented avails that may be implemented utilizing the previously described environment, systems, and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1.

Figure 3:
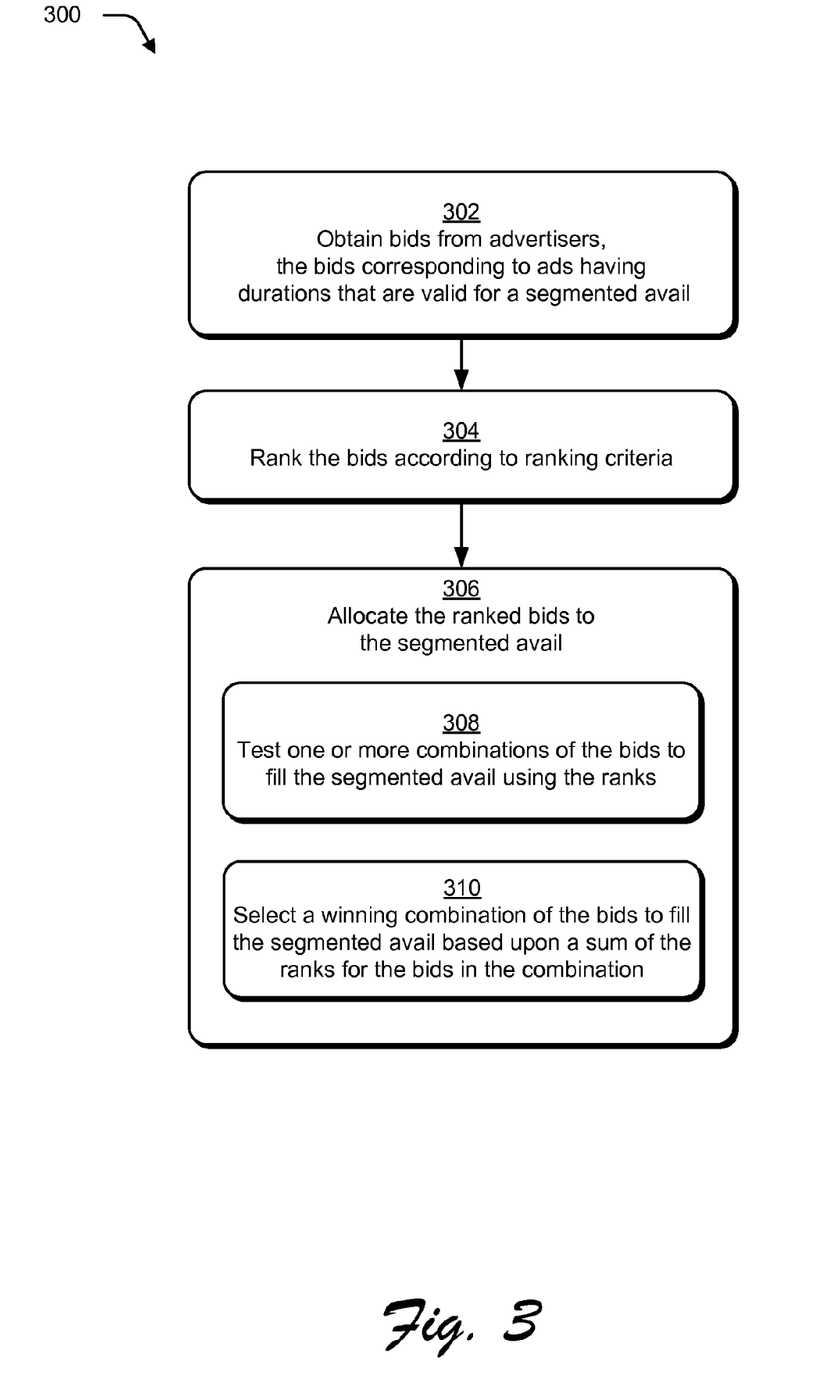
FIG. 3 is a flow diagram depicting an example procedure in accordance with one or more embodiments.

FIG. 3 is a flow diagram that describes an example procedure 300 in accordance with one or more embodiments. In at least some embodiments, the procedure 300 can be performed by a suitably configured computing device, such as a network operator 102 of FIG. 1, or other computing device having an ad manager module 128.

Step 302 obtains bids from advertisers. In particular, bids can be selected to match a subject segmented avail that is being auctioned by the ad manager module 128. For instance, bids can be obtained from media buys that are input to an ad management system and described by various bid data 134. Media buys and/or corresponding bids can be communicated between advertisers and an ad management system in any suitable way. One way this can occur is through a bid entry interface that is exposed via the ad manager module 128. The bid entry interface can be accessible over a network by way of the bid manager module 136, a browser, and/or other suitable applications.

Various bid data 134 can be input in any suitable way to define media buys and/or create ad campaigns using selectable criteria. By way of example and not limitation, bid data 134 can include budget and impression criteria for an ad/campaign, audience targeting criteria, content selection criteria, scheduling criteria, and/or other types of criteria that can be used to specify placement of advertisements 138 from advertisers 106.

Budget and impression criteria can be configured to designate price and quantity aspects of a media buy such as a number of impressions, an overall budget, maximum price, average price per impression, and so forth. Audience targeting criteria defines characteristics and/or behaviors of an audience that is targeted by the media buy including for example viewer profile and demographics, selected client favorite information, viewer geographic or market location information (e.g., state, city, zip code), client device capabilities (e.g., pay per view access, high definition, internet connection, device resolution), viewing history and patterns, and so forth. Content selection criteria relates to the kind of content targeted by the media buy including for example program categories, program ratings, keywords, actor selections, intended/expected audience information (e.g., child, family, age of viewer, male or female), etc.

Scheduling criteria relates to when and how often an advertiser would like an advertisement to be placed. For instance, scheduling criteria can include time and/or day constraints, program schedules, selection of particular channels or networks, live or time-shifted placement, and segment duration to name a few. Scheduling criteria can also include adjacency constraints that can control the frequency for an ad and/or the kinds of other ads that are shown within the same ad block, program, or time period. Examples of such adjacency constraints include constraints on frequency of ad placement within a day, program or time block, placement of an ad within a program category, placement of an ad with ads of a similar type or product, and placement of the ad with other ads from the same advertiser, to name a few.

In at least some embodiments, the bids that are obtained correspond to ads having various durations that are valid for a subject segmented avail, such as in the example segmented avail 202 described in relation to FIG. 2. Ad manager module 128 can operate to examine the bid data 134 to select bids having appropriate lengths for an avail. A set of possible duration combinations that are valid for the avail can be used to determine the appropriate length for ads that are candidates to fill at least a portion of the avail. For example, given the example segmented avail 202 of FIG. 2, the ad manager module 128 can process bid data 134 to identify ads that can potentially be used to fill the valid durations of sixty seconds, thirty seconds, and/or fifteen seconds.

Further, obtaining bids can also involve pre-selecting bids to match at least some characteristics of the subject segmented avail based on examination of corresponding bid data 134. For instance, ad manager module 128 can compare bid data 134 to auction parameters 132 that describes characteristics of the subject avail to select bids that match the avail. This pre-selection of bids can be performed to identify a group of bids that are candidates to fill the segmented avail and/or to eliminate bids having constraints that prevent the bids from being candidates to fill the avail. For example, bids can be pre-selected based on any number of threshold characteristics that are suitable to divide candidate bids from non-candidate bids, such as day/time, program type, duration, geography, and so forth. In this manner the number of bids to undergo further processing can be reduced (e.g., filtered) to pre-select a group of bids having at least some criteria that match selected characteristics of the subject avail.

Having obtained suitable bids, step 304 ranks the bids according to ranking criteria. In particular, ad manager module 128 can operate to assign a rank "R" to each bid in any suitable way. Various ranking criteria, logic, and/or algorithms can be encoded as part of auction parameters 132 and used to implement the ranking. In general the rank R is configured to express a relative value of the bid on an avail in relation to other bids participating in an auction. Accordingly, the rank that is assigned to a particular bid can be different in relation to different avails.

In at least some embodiments, the rank can be computed using a weighted formula that is configured to account for multiple different ranking criteria C that are weighted using corresponding weight factors W. An example format for a suitable weighted formula can be expressed as follows:

$$R = W_1 C_1 + W_2 C_2 + \ldots W_N C_N$$

In the above expression, any number "n" of ranking criteria (where n can be an integer from 1 to N) can be used to compute the rank R. Specifically, R can be computed by summing values $W_n C_n$ that represent the value of a particular ranking criteria $C_n$ multiplied by a weight factor $W_n$. Naturally, a variety of different weighted formulas can be constructed that employ different ranking criteria in different combinations. Further, the weight factors $W_n$ can be adjusted to control the relative impact of different ranking criteria on the overall rank R. The weight factors $W_n$ can be applied to emphasis and/or discount different ranking criteria. Various suitable ranking criteria are contemplated that can be used to implement the ranking using the example weighted formula, and/or other suitable ranking logic/algorithms configured to take in to account the various criteria.

In at least some embodiments, the rank R is configured to account for at least (1) a reach factor, (2) an efficiency factor, and (3) a monetary value factor. The reach factor is indicative of the exposure of the avail to viewers. For example, the reach factor is configured to account for the size of the avail (e.g., actual or expected viewership). In general, a larger value of the reach factor can indicate that more viewers will be exposed to the avail overall.

The efficiency factor measures how effectively the subject segmented avail meets criteria of a bid designated by the advertiser. In other words, the efficiency factor assesses the closeness of the match between criteria of a bid and characteristics of the avail. This can include a measurement of a relative percentage of the total viewership that is "targeted" by the bid in comparison to other avails. Accordingly, a larger value for the efficiency factor can indicate that a higher percentage of total viewers of the avail are targeted by criteria associated with the bid.

The monetary value factor is indicative of a monetary value associated with allocation of the bid to the subject avail. The monetary value factor can encompass the amount of money the advertiser is willing to pay for the avail, price per impression, owner/operator profitability, budget constraints, avail pricing, and/or other financial considerations. The monetary value factor can also account for any premiums or discounts associated with the advertiser, avail, content, and so forth.

The reach factor, efficiency factor, monetary value factor, and/or other factors can be employed in any combination to form a ranking formula that is suitable to rank bids one to another. A variety of other factors are contemplated that can be employed for the ranking. By way of example, the other factors can include particular operator/owner goals, pricing and profitability factors, an advertiser volume factor, preferred customer factors, constraints placed on an avail by a content provider 108, overall matching goals for a campaign or other group of bids, adjacency constraints, advertiser demand factors, avail inventory factors, scheduling factors, and/or priority factors associated with bids and avails, to name a few examples.

Another example factor can also be applied to account for segment duration. For instance, a segment duration factor can be applied as one component of a ranking formula as described above. Additionally or alternatively, ranks that are computed by a suitable ranking formula can be adjusted by the segment duration factor to account for different durations. This ensures equivalency of the highest possible sum of ranks associated with different duration combinations. For example, a thirty second segment can be adjusted to have half the value of a sixty second segment. Accordingly, the total possible sum of ranks for a sixty second avail will be the same (e.g., normalized) regardless of whether the avail is configured with two thirty second segments or one sixty second segment.

Given a group of bids that are ranked relative to a segmented avail, step 306 allocates the ranked bids to the segmented avail. This allocation can occur in any suitable way. For example, step 308 can test one or more combinations of the bids to fill the avail using the ranks assigned to bids in step 304. Then, step 310 can select a winning combination of the bids to fill the avail. The winning combination can be selected based at least in part upon a sum of ranks for bids in the combination. For example, the winning combination can be determined by analyzing multiple allocations of the bids to duration combinations that are valid for the segmented avail. Based on this analysis, the winning combination can be selected to maximize a value for the sum of ranks assigned to bids in the winning combination. Additional details regarding example techniques by which bids can be allocated to segmented avails can be found in the discussion of FIG. 4 that follows just below.

Figure 4:
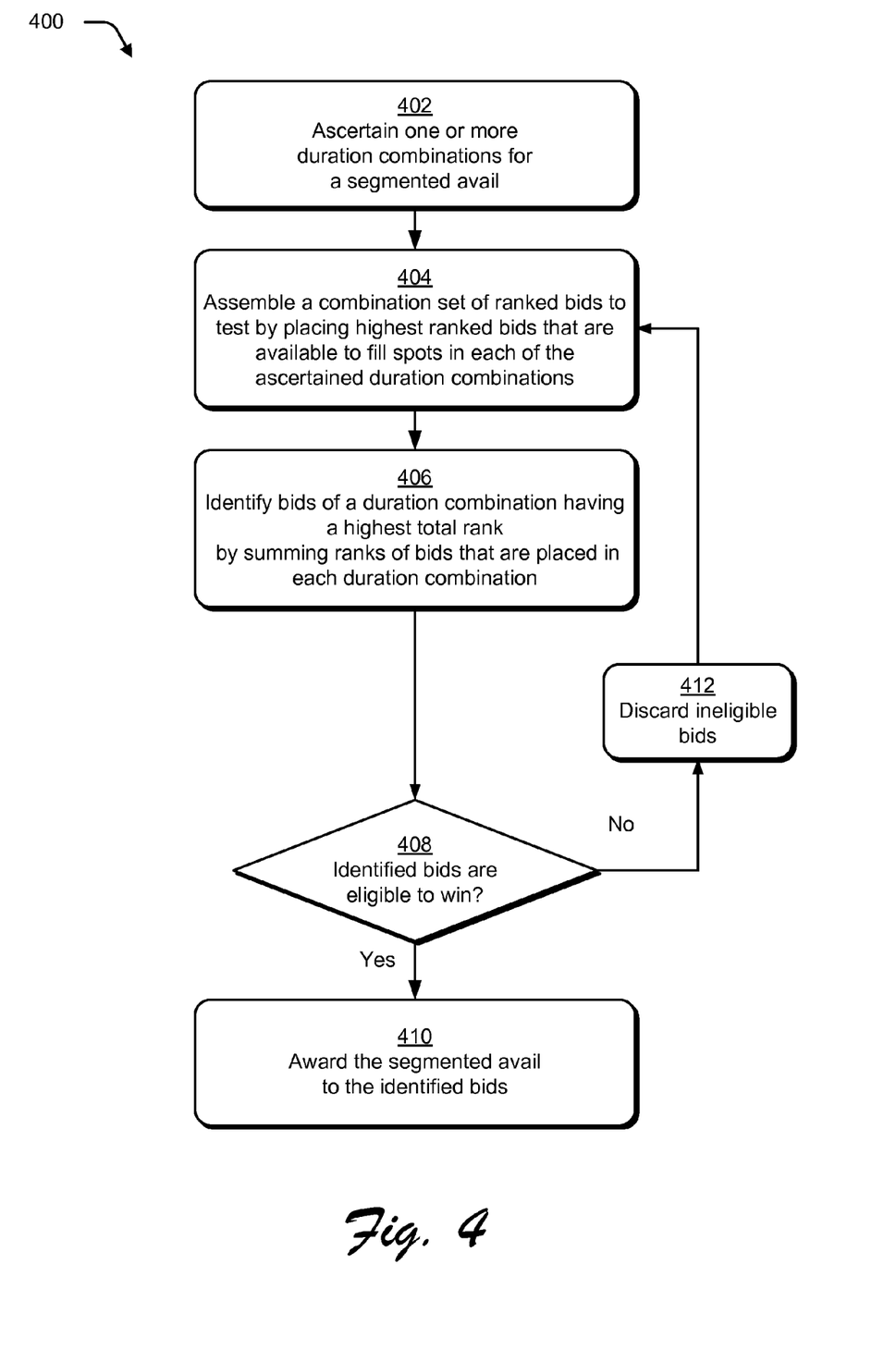
FIG. 4 is another flow diagram depicting an example procedure in accordance with one or more embodiments.

FIG. 4 is a flow diagram that describes an example procedure 400 in accordance with one or more embodiments. In at least some embodiments, the procedure 400 can be performed by a suitably configured computing device, such as a network operator 102 of FIG. 1, or other computing device having an ad manager module 128.

Step 402 ascertains one or more duration combinations for a segmented avail. Duration combinations that are valid for segmented avails can be determined in any suitable way. In at least some embodiments, avail characteristic data that is included as part of auction parameters 132 can be used to specify duration combinations that are valid for a particular avail. Duration combinations can also be specified by metadata or other suitable data encoded in or otherwise associated with an avail 130. Such data can also be configured to indicate whether segments are enabled or disabled for a particular avail. Accordingly, the ad manager module 128 can reference the auction parameters 132, characteristic data, and/or other suitable data to ascertain duration combinations that are associated with an avail that is the subject of an auction.

For the purpose of example, assume that an auction is being conducted for the example segmented avail 202 of FIG. 2. In this example, ad manager module 128 can examine avail characteristic data and/or other suitable data corresponding to the segmented avail 202 to ascertain the three possible duration combinations (e.g., duration combinations 204, 206, 208) that are valid to fill the segmented avail 202. Ad manager module 128 can also obtain and rank candidate bids corresponding to the segmented avail and duration combinations using techniques described in relation to procedure 300 of FIG. 3. For instance, ad manager module 128 can operate to obtain the example groups of ranked bids (e.g., groups 210, 212, 214) for the segmented avail 202 as illustrated in FIG. 2. Ad manager module 128 can then allocate the candidate bids to the segmented avail using the rankings.

In particular, step 404 assembles a combination set of ranked bids to test. A combination set can be constructed by allocating or otherwise associating bids to segments of the valid duration combinations ascertained for an avail. Accordingly, a combination set includes one or more duration combinations corresponding to an avail and a potential allocation of bids to the one or more duration combinations. In at least some embodiments, bids are placed into the segments in order of rank beginning with the highest ranked bids of each duration. One or more different combination sets (e.g., potential bid allocations) can be constructed and tested successively in accordance with procedure 400 until winning bids are determined for the segmented avail.

In particular, step 406 identifies bids of an ad duration combination having a highest total rank. This can occur by summing ranks of the bids that are placed in each duration combination included in the combination set that is assembled in step 404. The duration combination having the highest sum of ranks of bids can then be identified by comparing the sum of ranks associated with each duration combination.

Before awarding the avail to the bids identified in step 406, step 408 determines whether the bids are eligible to win. This can involve checking constraints associated with bids to see if any conditions are violated. For example, adjacency criteria, content selection criteria, budget depletion, or other constraints associated with bids could prevent one or more of the bids identified in step 406 from being eligible to win.

If the identified bids are each eligible to win, step 410 awards the segmented avail to the identified bids. In other words, the duration combination and corresponding bids identified in step 406 are selected to win the auction for the segmented avail, so long as there are no ineligible bids determined for the combination by the eligibility determination of step 408.

When one or more of the identified bids are determined to be ineligible, though, procedure 400 proceeds to step 412 where the ineligible bids are discarded. Procedure 400 then returns to step 404, and steps 404 to 408 can be repeated iteratively with another combination set of ranked bids (e.g., another potential bid allocation). In particular, any discarded bids can be replaced with the next highest ranking bids to assemble another combination set of ranked bids to process as per step 404. Then, a duration combination included in the combination set that has the highest rank is again identified per step 406 and the determination regarding whether bids are eligible to win per step 408 is repeated. One or more such iterations can occur in this manner for different combinations sets until a duration combination of eligible bids is identified. At this point, the segmented avail is awarded to the eligible bids per step 410.

To further facilitate understanding of the example techniques for auctioning segmented avails that are described above and below, a discussion of an example bid allocation scenario is provided just below.

EXAMPLE BID ALLOCATION

Figure 5:
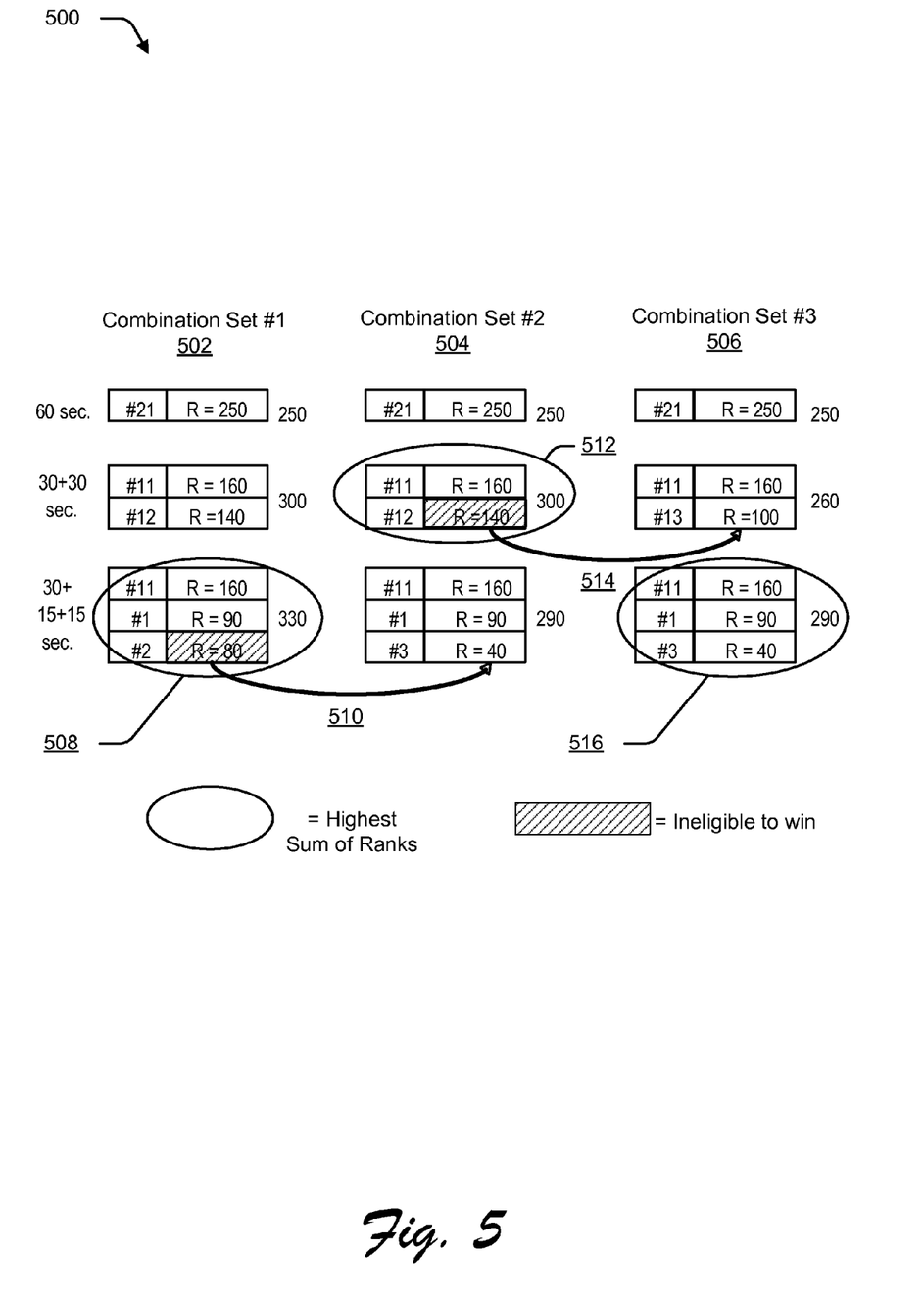
FIG. 5 is an illustration of an example bid allocation scenario for a segmented avail in accordance with one or more embodiments.

Consider now a bid allocation example that is described in the context of the example segmented avail 202 of FIG. 2. The bid allocation example is illustrated in FIG. 5 generally at 500. In particular, FIG. 5 depicts an example bid allocation scenario that corresponds to allocation of the example bids of FIG. 2 to the example segmented avail 202. FIG. 5 includes three example combination sets including combination set 502, combination set 504, and combination set 506. Each combination set includes the three duration combinations 204, 206, 208 associated with the segmented avail 202 and a potential allocation of bids for each duration combination. The example combination sets of FIG. 5 can be assembled and tested successively in accordance with procedure 400 of FIG. 4. Of course, in other examples, fewer or more combination sets can be involved in the bid allocation depending on how quickly a duration combination having eligible bids is identified.

To perform the bid allocation, the combination set 502 can be assembled using the highest ranking bids that are available from candidate bids obtained for the segmented avail 202. For instance, the highest ranking bids from FIG. 2 are illustrated as being allocated to segments in the duration combinations of the combination set 502 in FIG. 5. The sum of ranks in the duration combinations are computed and the duration combination having the highest sum of ranks is identified. The duration combination having the highest sum of ranks can be considered as a potential winner of the auction. In this example, the 30+15+15 duration combination 508, which has an associated sum of ranks of 330, is identified as the duration combination having the highest sum of ranks.

Each bid in duration combination 508 can be checked to ensure that the bids are eligible to win. In this example, Bid #2 is found to be ineligible based on one or more criteria. For instance, winning of the particular avail could be found to exceed the daily or weekly budget associated with the bid. Due to the ineligible bid, the 30+15+15 duration combination 508 cannot win the auction. Accordingly, the ineligible bid is discarded to form the next combination set for testing and the process is repeated.

In particular, combination set 504 can be assembled by replacing the ineligible bid with the next highest bid having the same duration. As indicated by the arrow 510, the ineligible fifteen second Bid #2 has been replaced in the combination set 504 with Bid #3, the highest remaining fifteen second bid. Now, the sums of ranks for the duration combinations in the combination set 504 are evaluated. The highest sum of ranks is now the sum of 300 corresponding to the 30+30 duration combination 512. Accordingly, bids in duration combination 512 are checked to ensure eligibility to win. In the depicted example, though, Bid #12 is also found to be ineligible based on one or more criteria. For instance, adjacency criteria associated with the bid that prevents the bid from being placed with a bid of the same product type or from a particular competitor could be found to be violated. Accordingly, the duration combination 512 cannot win the auction, and another combination set is assembled.

In particular, combination set 506 can be assembled by replacing ineligible Bid #12 with the next highest bid having the same duration. As indicated by the arrow 514, the ineligible Bid #12 has been replaced in the combination set 506 with Bid #13, the highest remaining thirty second bid. Now, evaluation of the sum of the ranks for the duration combinations in combination set 506 identifies the highest-rank-sum as the sum of 290 corresponding to the 30+15+15 duration combination 516. Further, an eligibility determination for the bids in this combination finds that the bids are each eligible to win. Accordingly, this duration combination 516 and the associated bids can be selected as winners of the auction for the segmented avail 202. The ads corresponding to the winning bids are associated with the segmented avail 202 to cause the ads to be placed when corresponding content is delivered to and/or presented via clients 104. Bids that are discarded as ineligible in the bid allocation process can be returned to a pool of candidate bids, and allocation for other segmented avails can occur in a similar way.

Having considered various embodiments, procedures, and examples related to auctioning segmented avails, consider now a discussion of an example system that can be employed to implement one or more embodiments.

EXAMPLE SYSTEM

Figure 6:
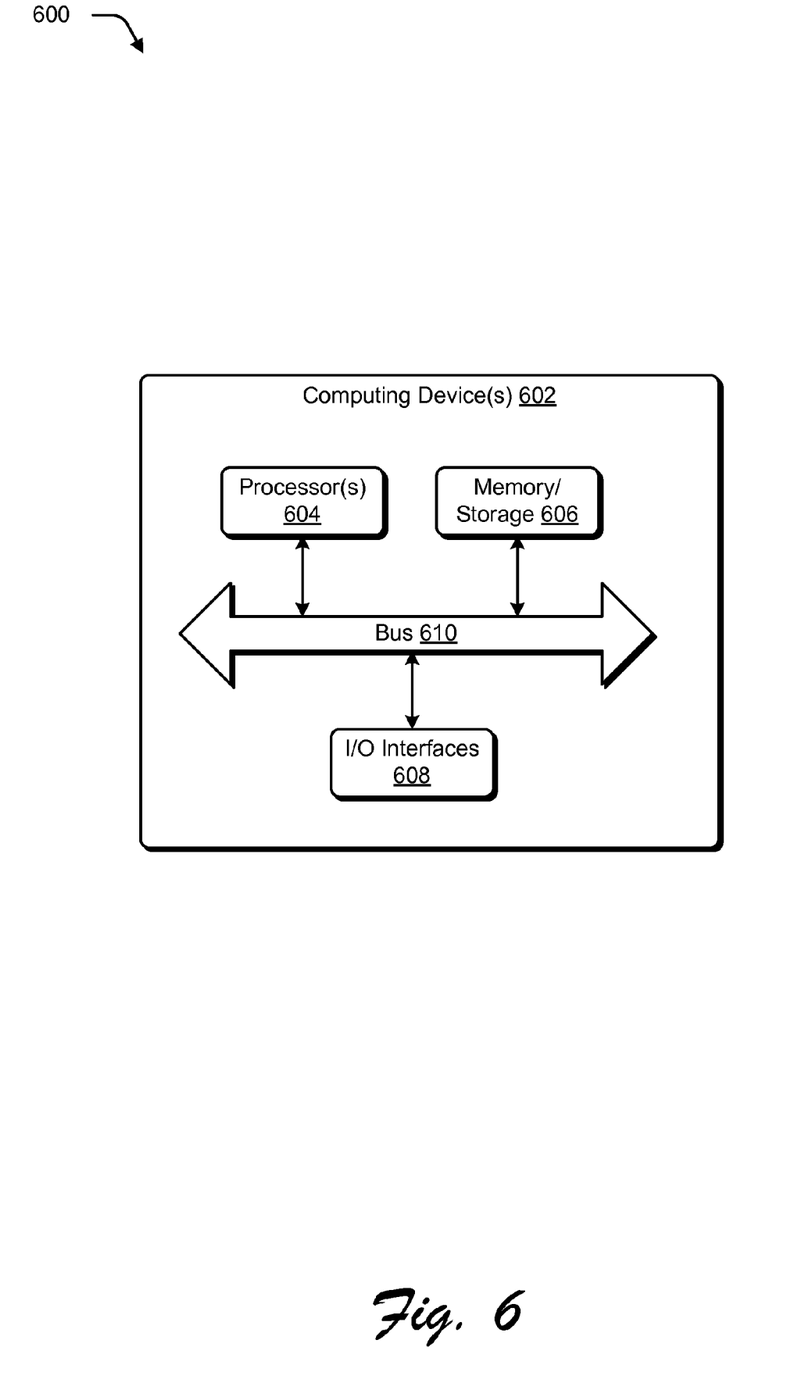
FIG. 6 is an illustration of an example system that can be used to implement one or more embodiments.

FIG. 6 illustrates an example system generally at 600 that includes an example computing device 602 that is representative of one or more such computing devices that can implement the various embodiments described above. The computing device 602 may be, for example, a server of a network operator 102 or content provider 108 of FIG. 1, a device associated with the client 104 or advertiser 106, and/or any other suitable computing device or computing system.

The example computing device 602 includes one or more processors 604 or processing units, one or more memory and/or storage components 606, one or more input/output (I/O) interfaces 608 for input/output (I/O) devices, and a bus 610 that allows the various components and devices to communicate one to another. The bus 610 represents one or more of several types of bus structures, including a memory bus or memory controller, a peripheral bus, an accelerated graphics port, and a processor or local bus using any of a variety of bus architectures. The bus 610 can include wired and/or wireless buses.

The memory/storage component 606 represents one or more computer storage media. The memory/storage component 606 may include volatile media (such as random access memory (RAM)) and/or nonvolatile media (such as read only memory (ROM), Flash memory, optical disks, magnetic disks, and so forth). The memory/storage component 606 may include fixed media (e.g., RAM, ROM, a fixed hard drive, etc.) as well as removable media (e.g., a Flash memory drive, a removable hard drive, an optical disk, and so forth).

The one or more input/output interfaces 608 allow a user to enter commands and information to computing device 602, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media."

Software or program modules, including the ad manger module 128, bid manager module 136, communication module 124, and other program modules, may be embodied as one or more instructions stored on computer-readable storage media. The computing device 602 may be configured to implement particular functions corresponding to the software or program modules stored on computer-readable storage media. Such instructions may be executable by one or more articles of manufacture (for example, one or more computing devices 602, and/or processors 604) to implement techniques for auctioning segmented avails, as well as other techniques. Such techniques include, but are not limited to, the example procedures described herein. Thus, computer-readable storage media may be configured to store instructions that, when executed by one or more devices described herein, cause various techniques for auctioning segmented avails.

The computer-readable storage media includes volatile and non-volatile, removable and non-removable media and/or storage devices implemented in a method or technology suitable for storage of information such as computer readable instructions, data structures, program modules, or other data. Computer-readable storage media can refer to media and/or devices that enable persistent and/or non-transitory storage of information in contrast to mere signal transmission. The computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

Conclusion

Although aspects of auctioning segmented avails have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method comprising:
   ranking bids corresponding to a segmented avail according to ranking criteria;
   selecting a winning combination of the ranked bids to fill the segmented avail based at least in part upon a sum of ranks assigned to bids in the winning combination.

2. A method as described in claim 1, wherein the segmented avail is associated with a total duration and is configured to enable multiple different duration combinations of bids to fill the total duration of the segmented avail.

3. A method as described in claim 1, further comprising
   determining one or more duration combinations for bids enabled by the segmented avail to fill a total duration of the segmented avail; and
   obtaining the bids as candidates for the segmented avail by selecting bids having durations that match durations that are valid for the determined one or more duration combinations.

4. A method as described in claim 1, wherein ranking the bids comprises applying a weighted formula to compute a rank for each bid based on the ranking criteria.

5. A method as described in claim 4, wherein the weighted formula applied to rank the bids is configured to include at least a reach factor, an efficiency factor, and a monetary value factor.

6. A method as described in claim 1, wherein ranking the bids comprises assigning a rank to each particular bid based upon at least:
   a number of viewers exposed to the segmented avail;
   a relative percentage of the number of viewers exposed to the segmented avail that match criteria defined by the particular bid in comparison to other avails; and
   a monetary value associated with the particular bid in relation to the segmented avail.

7. A method as described in claim 1, wherein the segmented avail is associated with content made available to clients over a network by a network operator.

8. A method as described in claim 1, wherein the bids correspond to media buys input by advertisers to place advertisements in conjunction with content distributed by a network operator to clients.

9. A method as described in claim 1, wherein selecting the winning combination further comprises:
   assigning bids according to ranks of the bids to multiple different duration combinations enabled by the segmented avail to fill a total duration of the segmented avail;
   calculating a sum of the ranks of bids assigned to each of the multiple different duration combinations;
   identifying a duration combination having the highest sum of the ranks; and
   determining whether the identified duration combination is eligible to win by checking constraints associated with bids assigned to the identified duration combination.

10. A method as described in claim 9, further comprising selecting the identified duration combination as the winning combination when it is determined that identified duration combination is eligible to win.

11. A method as described in claim 9, further comprising:
    discarding one or more bids of the identified duration combination when it is determined that identified duration combination is ineligible to win based on the constraints associated with bids; and repeating the calculating, identifying, determining and discarding using replacements for bids that are discarded until the determining determines an eligible combination.

12. A method comprising:
ascertaining one or more duration combinations that are enabled to fill a total duration for a segmented avail that is the subject of an auction;
placing bids obtained from advertisers for the segmented avail into the duration combinations according to ranks assigned to bids;
comparing a sum of the ranks of bids assigned to each of the duration combinations to identify a duration combination having a highest sum of the ranks;
determining whether the identified duration combination is eligible to win the auction by checking constraints associated with bids placed in the identified duration combination; and
when the identified duration combination is eligible to win the auction, awarding the segmented avail to the bids placed into the identified duration combination.

13. A method as described in claim 12, further comprising:
when the identified duration combination is ineligible to win the auction, replacing bids in the identified duration combination that cause the duration combination to be ineligible, and repeating the comparing and determining using duration combinations that result from the replacing.

14. A method as described in claim 12, further comprising ranking the bids using ranking logic that combines multiple ranking criteria to assign a rank to each bid.

15. A method as described in claim 12, further comprising ranking the bids using a weighted formula configured to include at least:
a reach factor indicative of a number of viewers exposed to the segmented avail;
an efficiency factor to measure a relative percentage of the number of viewers exposed to the segmented avail that match criteria defined by particular bids in comparison to other avails; and
a monetary value factor indicative of a monetary value associated with the particular bids in relation to the segmented avail.

16. A method as described in claim 12, further comprising obtaining the bids by:
examining bid data that describes media buys from advertisers for placement of advertisements in conjunction with distributed content; and
pre-selecting the bids based upon criteria for the bids designated by the bid data that match characteristics of the segmented avail.

17. One or more computer-readable storage media comprising computer-executable instructions stored thereon that, when executed by one or more components of a computing system, cause the computing system to perform acts including:
conducting an auction for a segmented avail that is configured to enable different duration combinations of ads to fill a total duration of the segmented avail by at least:
ranking bids from advertisers to assign ranks to the bids that express relative values of the bids in relation to the segmented avail; and
analyzing one or more allocations of the ranked bids to the different duration combinations to identify a duration combination that is eligible to win the auction and has a highest value for a sum of ranks assigned to bids allocated to the duration combination; and
awarding the segmented avail to the identified duration combination.

18. One or more computer-readable storage media as described in claim 17, wherein ranking the bids comprises applying a weighted ranking formula that computes the ranks by summing values for multiple ranking criteria multiplied by corresponding weight factors for the multiple ranking criteria.

19. One or more computer-readable storage media as described in claim 17, wherein analyzing the one or more allocations of the ranked bids to the different duration combinations comprises:
allocating the ranked bids into the different duration combinations in order of the ranks beginning with bids having higher relative ranks;
selecting one of the different duration combinations that has the highest sum of the ranks of bids that are allocated to the duration combination; and
determining whether the selected duration combination is eligible to win the auction by checking constraints associated with bids allocated to the selected duration combination.

20. One or more computer-readable storage media as described in claim 17, wherein the segmented avail comprises an opportunity to insert one or more ads within content distributed by a network operator to one or more clients.

* * * * *